Dec. 9, 1969     S. E. KALEN     3,483,041
BATTERY-ELECTROLYTE PACKAGING CONCEPT
Filed Sept. 1, 1967
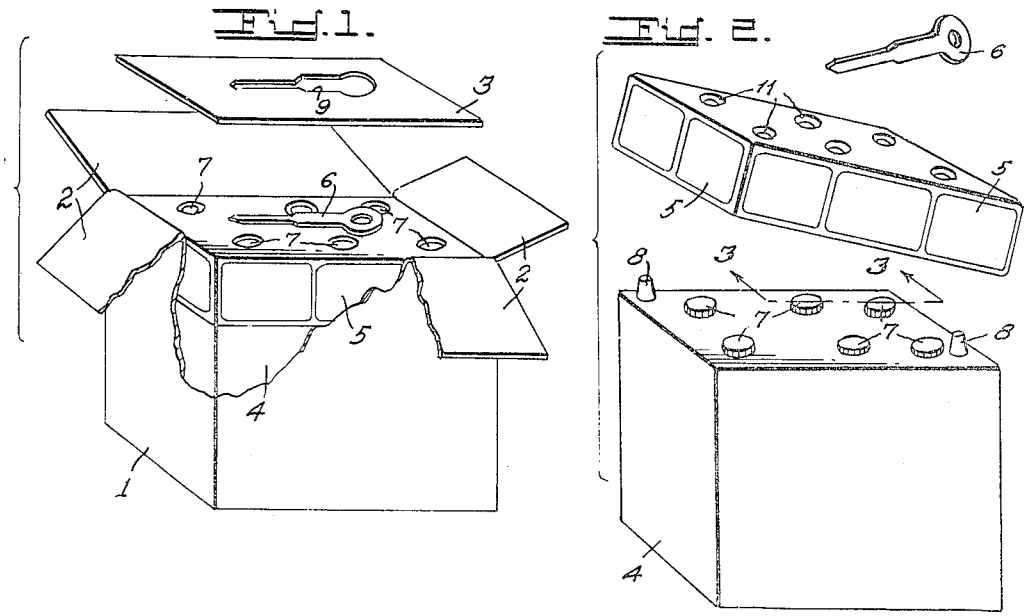
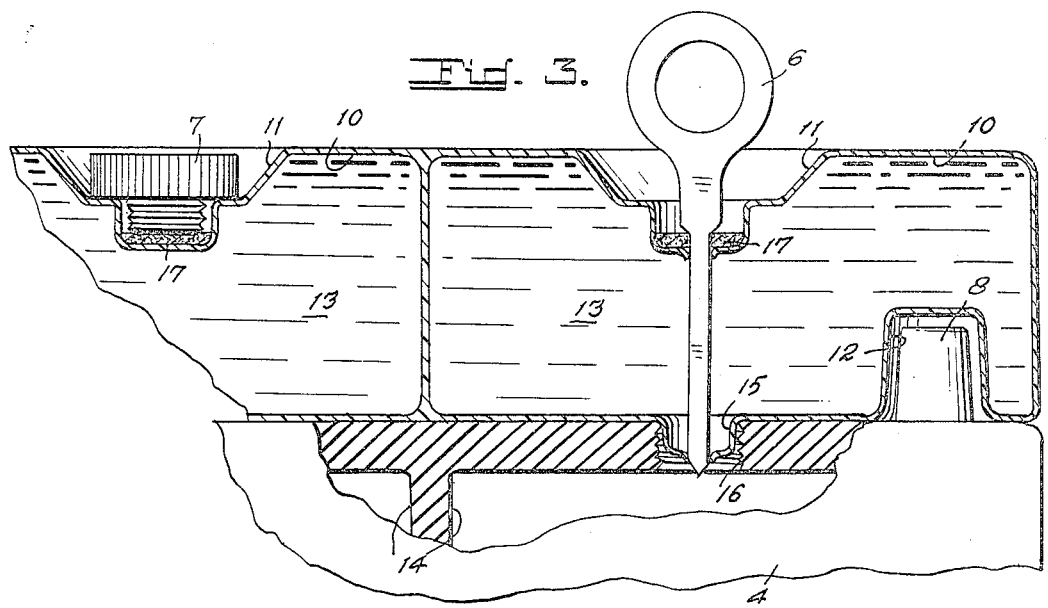
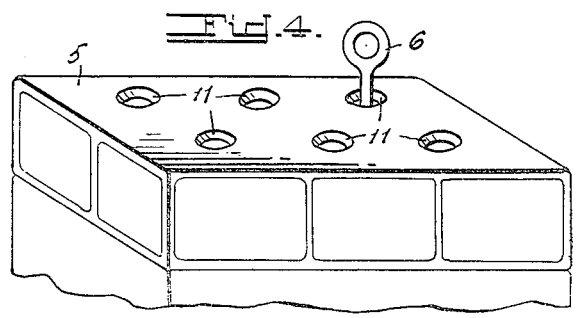
INVENTOR,
Sylvester E. Kalen
By: Harry M. Saragovitz,
Edward J. Kelly
Herbert Berl & Robert P. Gibson
Attorneys.

United States Patent Office 3,483,041
Patented Dec. 9, 1969

3,483,041
BATTERY-ELECTROLYTE PACKAGING CONCEPT
Sylvester E. Kalen, Aberdeen, Md., assignor to the United States of America as represented by the Secretary of the Army
Filed Sept. 1, 1967, Ser. No. 665,693
Int. Cl. H01m 45/00, 7/00; B65d 81/32
U.S. Cl. 136—162      7 Claims

ABSTRACT OF THE DISCLOSURE

A package containing both battery and electrolyte in separate containers. The electrolyte container is disposed on top of the battery in the package and is divided into as many compartments, as there are cells in the battery. Wells are provided in the electrolyte container to register with the filling holes in the battery cells, the terminals and to contain the closure plugs. When the battery is to be assembled the compartments are punctured to permit the electrolyte to flow into the battery cells and the electrolyte container discarded.

---

The invention described herein may be manufactured, used, and licensed by or for the Government for governmental purposes without the payment to me of any royalty thereon.

Dry charged batteries are furnished as separate items and often batteries are received and not the electrolytes, and conversely the other way around. One item of course, is of no value without the other.

This is especially disadvantageous, for instance in supply the aforesaid items in a military supply system, where it is difficult to obtain the items when in the field and the supply lines cut off.

A typical disadvantage in shipping both battery and electrolyte in a single package is observed from U.S. Patent 2,452,049 in which a bottle containing the electrolyte is placed on top of an inverted battery. The bottle is broken and the electrolyte is permitted to seep into the battery cells, then the package is inverted and opened. Some electrolyte would be lost during this operation which is also messy due to spillage. Thus the cells would not contain the correct amount of electrolyte.

The present invention eliminates the aforesaid difficulties by permitting the battery to be upright in the package and by having the electrolyte container on top of the battery with each compartment registering with a respective cell of the battery. When each compartment is punctured, the electrolyte fluid will drain into the cell and the correct amount thereof will be in each cell and without spillage; also no wasteage of extra amount of electrolyte required to compensate for proper filling of the cells.

The battery can then be removed and the electrolyte container discarded and the battery capped.

It is therefore an object of this invention to provide a battery package in which both the battery and electrolyte container are contained as separate units.

It is another object to provide a battery and electrolyte package to facilitate the easy and speedy assembly of a battery and its electrolyte.

A further object is to provide the filling of each cell of a battery with the correct amount of electrolyte.

A still further object is to enable the filling of a battery with an electrolyte without spillage.

Further objects will become apparent as the specification proceeds in conjunction with the annexed drawing, in which, FIG. 1 is an exploded, perspective view of the battery package, partly broken away to expose the battery and the electrolyte container;

FIG. 2 is an exploded perspective view of the contents of the package;

FIG. 3 is a partial sectional view taken along the line 3—3 of FIG. 2; and,

FIG. 4 is a detail perspective view of the electrolyte container as disposed on the top side of the battery for filling and showing the puncturing key in one of the wells.

Referring in detail to the drawing, reference character 1 designates the battery-electrolyte containing carton which includes closing flaps 2 and a protective shield 3. Also shown, in FIG. 1, is a battery 4, electrolyte container 5 and puncturing key 6.

Battery 4 may be of a standard dry charge type and is divided into multiple cells 14, each cell being provided with a threaded filling opening 16 and a threaded closure plug 7 therefore and also a pair of terminal posts 8.

The protective shield 3 may be a sheet of cardboard having a cut-out 9 contoured to receive and hold key 6 and to protect the container 5 during shipment of the package.

Electrolyte container 5 may be fabricated from a transparent plastic material adapted to be easily punctured and it is divided into as many compartments 10 as there are cells 14 in battery 4.

Container 5 is of the same width and length as that of battery 4 and compartments 10 are of the same width and length as each cell 14. Each compartment 10 contains the correct amount of electrolyte required for servicing a cell 14.

As best seen in FIG. 3, each compartment 10 is provided with a downwardly directed well 11 in its top wall, each well 11 being of a shape to store one of the closure plugs 7 when the package is closed for shipment.

The compartments 10 that will be over the battery terminal posts are provided with upwardly directed wells 12 (only one being shown in FIG. 3) that receive the post 8 therein during assembly for shipping or filling.

Each compartment 10 is filled with an electrolyte 13 (by means not shown). The amount of electrolyte 13 will be that required for filling a cell 14 in battery 4.

Each compartment 10 is further, provided with a downwardly directed well 15 in its bottom wall and this well is in its bottom wall and this well is in axial alignment with well 11, above it.

Each well 15 will extend downwardly into a respective filling opening 16 as seen in FIG. 3.

Each well 11 is provided with a felt disc 17 in its bottom as shown for a purpose that will be apparent later.

In packing for shipment, battery 4 is placed upright in the bottom of carton 1 and the electrolyte container 5 is superimposed over battery 4 whereby wells 15 are nested in threaded filling openings 16 of battery 4 (the plugs 7 having been removed). Wells 12 will fit over terminal posts 8.

Then closure plugs 7 are placed in wells 11 and shield 3 is placed over container 5. This holds the closure plugs tight in wells 11 and prevents removal until it is desired to unpack.

Now, key 6 is placed in cut-out 9 and flaps 2 closed and sealed and the package is ready for storage or shipment. There will be no separation of the units in the package until it is opened, so that there will be no loss of any of the items before the battery is serviced for use.

When the package has reached the destination and it is ready to service the battery for use, the carton 1 is opened in the usual manner by opening flaps 2. Shield 3 is removed as well as key 6 and the closure plugs 7 from wells 11. These items are set aside until needed.

Container 5 and battery 4 may be removed from carton 1, or left in the carton if desired.

If the battery 4 and container 5 are removed, they are arranged in the same relation as they were in the carton 1, the container 5 on top of the battery 4.

Since wells 11 in the top side of container 5 are in axial and vertical alignment, wells 15 will be directly below them, and since wells 15 are nested in openings 16 and wells 12 fit over the battery terminals 8 there will be no danger of the container 5 becoming dislodged from its proper filling position.

Key 6 is then pushed through felt disc 17 in one well 11, which prevents splashing or loss of electrolyte 13, and punctures the floor of well 11 and upon further pushing punctures the floor of a well 15 then removed. The electrolyte 13 in that compartment 10 will drain into the cell 14. This operation is repeated for each compartment 10 until all the electrolyte 13 has drained into its respective cell 14. The container is then discarded and the threaded closure plugs 7 are screwed into openings 16. The battery is now ready for use.

It will be apparent that a combined package for the separate containment of both battery and electrolyte has been devised that enables shipment of battery components without the danger of one component being shipped without another and to enable the assembler to quickly fill all the cells of a dry charge battery without spillage and with each battery cell receiving the correct amount of an electrolyte and further, eliminate the necessity of losing a portion of the electrolyte during the filling process.

While only a preferred form of the invention is shown and described, other forms of the invention are contemplated and numerous changes and modifications may be made therein without departing from the spirit of the invention as set forth in the appended claims.

What is claimed is:

1. A combined package containing both a dry, multi-celled battery and a liquid electrolyte filled container for filling said battery as separate units therein, said battery being disposed upright in the lower portion of said package, there being a filling opening in its upper wall of each cell and a closure plug therefor, there being a pair of terminal posts on said battery, said electrolyte container being disposed on top of said battery in said package and being divided into a number of compartments equal to the number of cells in said battery, a first means in the bottom wall of each said compartment for filling a said cell with said electrolyte therein, a second means in the bottom wall of said container to receive said terminal posts, a downwardly directed well in the top wall of each compartment in which said closure plug is stored, each said well being in vertical axial alignment with said first means in the bottom wall of each said compartment whereby its location thereof will be indicated for puncturing, and a felt disc in the bottom of each said well to prevent splashing of said electrolyte in said compartment when said well and a respective first means are punctured.

2. A combined package as set forth in claim 1 wherein said first means comprises a downwardly directed well in the bottom wall of each said compartment and being continuous therewith, each said well extending a distance into a said filling opening of each said cell when said container is placed in a filling position on said battery whereby when the floor of said well is punctured the electrolyte contained in its respective compartment will drain into the respective battery cell.

3. A combined package as set forth in claim 1 wherein said second means comprises an upwardly directed well, one for each battery terminal post, in the bottom wall of said electrolyte container and continuous therewith, said wells adapted to cover a respective post when said container is in filling position on said battery.

4. A combined package as set forth in claim 1 wherein said container is fabricated from a puncturable material.

5. An electrolyte containing container for use with an unactivated battery having a top filling opening into the cell portion thereof, said package comprising a housing containing an electrolyte, and positionable on top of said battery, said package having an inwardly recessed well on the top portion to receive a cap and an outwardly protruding well on the lower portion thereof to permit extension into a top filling opening, said wells being vertically aligned and having bottoms composed of puncturable material whereby the well bottoms may be opened to permit the flow of the electrolyte into the cell interiorally of the filling opening.

6. An electrolyte containing container according to claim 5 wherein a plurality of compartments are located within the housing and each having a pair of aligned wells and where the plurality of pairs are positioned with respect to each other so that each pair will be communicable with a respective battery cell.

7. A combined package containing both an unactivated battery disposed in the bottom thereof an an electrolyte filled container disposed on top of said battery, there being a top filling opening in the cell portion of said battery, aligned puncturable well means in the top and bottom of said container in registry with said opening for permitting flow of said electrolyte into said cell portion of said battery, said bottom well means extending into said opening and a flat protective shield disposed on top of said electrolyte container, there being a cut out in said shield which contains a tool for puncturing said puncturable means, said cut out having a contour matching the shape of said tool whereby when the shield is removed said tool is ready for use.

References Cited

UNITED STATES PATENTS

| 1,304,894 | 5/1919 | Liebreich | 136—162.41 |
| 2,713,080 | 7/1955 | Barrett | 136—170 |
| 2,832,814 | 4/1958 | Shannon | 136—170 |

WINSTON A. DOUGLAS, Primary Examiner

D. L. WALTON, Assistant Examiner

U.S. Cl. X.R.

136—181; 206—2